(12) United States Patent
Togino

(10) Patent No.: US 8,289,631 B2
(45) Date of Patent: Oct. 16, 2012

(54) WIDE-ANGLE OPTICAL SYSTEM

(75) Inventor: Takayoshi Togino, Shibuya-ku (JP)

(73) Assignee: Olympus Corporation, Toyko (JP)

( * ) Notice: Subject to any disclaimer, the term of this patent is extended or adjusted under 35 U.S.C. 154(b) by 56 days.

(21) Appl. No.: 12/448,231

(22) PCT Filed: Nov. 15, 2007

(86) PCT No.: PCT/JP2007/072602
§ 371 (c)(1),
(2), (4) Date: Jun. 12, 2009

(87) PCT Pub. No.: WO2008/072457
PCT Pub. Date: Jun. 19, 2008

(65) Prior Publication Data
US 2010/0014174 A1    Jan. 21, 2010

(30) Foreign Application Priority Data
Dec. 15, 2006 (JP) .................... 2006-338139

(51) Int. Cl.
*G02B 13/04* (2006.01)
*G02B 13/18* (2006.01)

(52) U.S. Cl. ............... 359/753; 359/715; 359/716

(58) Field of Classification Search .......... 359/793, 359/781, 782, 770, 761, 762, 742, 680, 681, 359/682, 749, 753, 715, 716
See application file for complete search history.

(56) References Cited

U.S. PATENT DOCUMENTS

| 2,947,219 | A | * | 8/1960 | Beernink et al. | ............. | 359/740 |
| 3,734,600 | A |   | 5/1973 | Shimizu |   |   |
| 7,295,386 | B2 | * | 11/2007 | Taniyama | .................... | 359/772 |
| 7,573,649 | B2 | * | 8/2009 | Arakawa | ...................... | 359/687 |
| 7,755,842 | B2 | * | 7/2010 | Rutzen | ......................... | 359/668 |
| 2006/0274433 | A1 |   | 12/2006 | Kamo |   |   |

FOREIGN PATENT DOCUMENTS

| DE | 2 163 615 | 7/1972 |
| FR | 2 119 047 | 8/1972 |
| GB | 1 334 974 | 10/1973 |
| JP | 45-37953 | 12/1970 |
| JP | 49-20534 | 5/1974 |
| JP | 10-288742 | 10/1998 |
| JP | 2001-141994 | * 5/2001 |
| JP | 2006-126323 | 5/2006 |
| JP | 2006-154365 | 6/2006 |
| JP | 2006-337691 | 12/2006 |

OTHER PUBLICATIONS

JP 2001-141994 Abstract.*
JP 2001-141994 translation.*

* cited by examiner

*Primary Examiner* — Scott J Sugarman
(74) *Attorney, Agent, or Firm* — Kenyon & Kenyon LLP

(57) ABSTRACT

The invention provides a superwide-angle imaging or projecting optical system provided that, albeit being a wide-angle optical system having an angle of view exceeding 180°, is of small size and reduced F-number and fast, and has improved f-θ performance. The optical system consists only of transmitting surfaces, and has an angle of view of 180° or more. The optical system comprises a front group ($G_f$) comprising at least one meniscus lens (L1) having a negative focal length, an aperture (S), and a rear group ($G_b$) comprising at least two lenses having a positive focal length. At least one transmitting surface in the front group is made up of an extended rotation free-form surface.

20 Claims, 7 Drawing Sheets

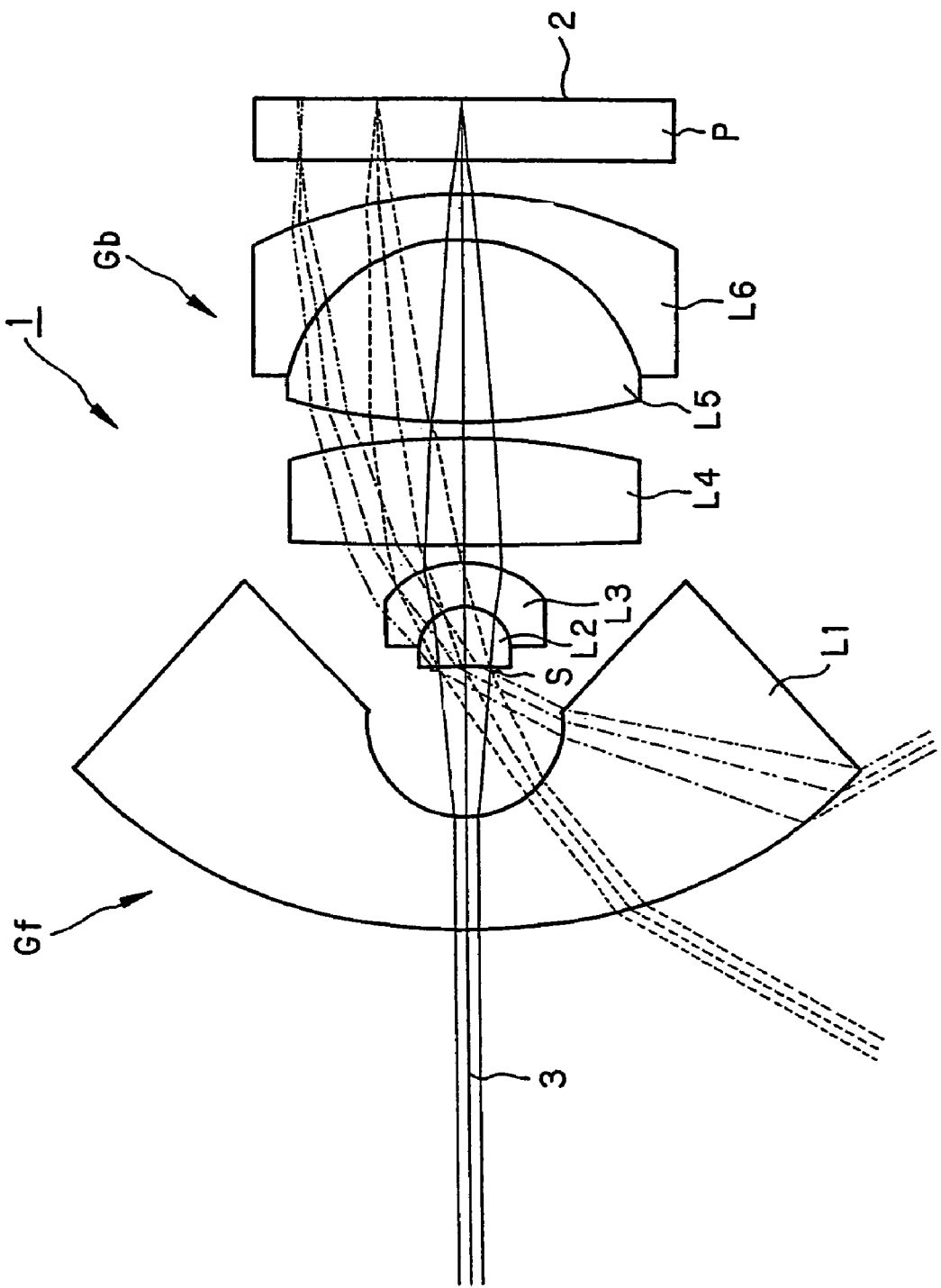

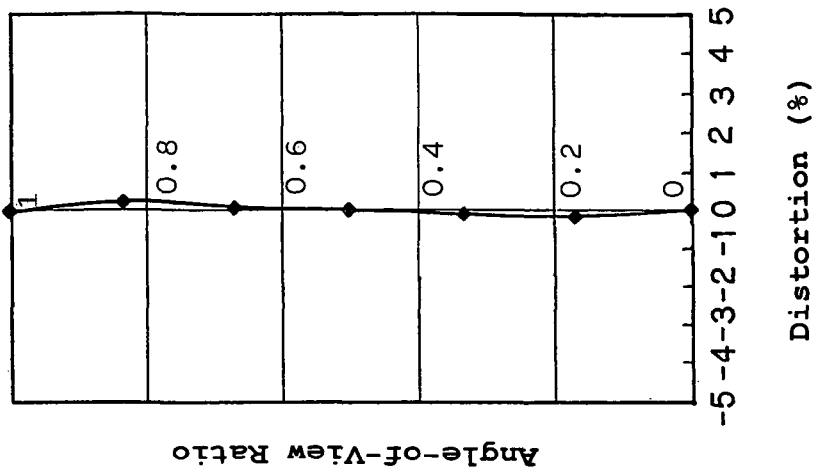
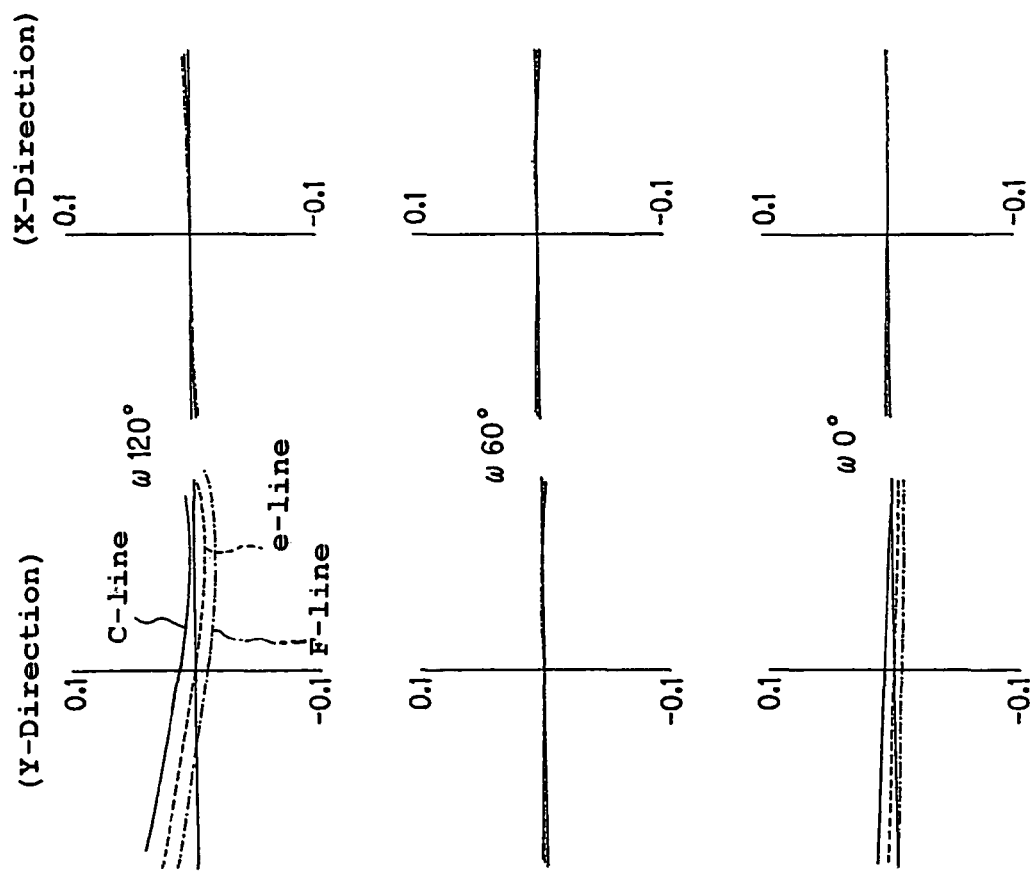

WIDE-ANGLE OPTICAL SYSTEM

CROSS-REFERENCE TO RELATED APPLICATION

The present application is based upon and claims the benefit of priority from the prior Japanese Patent Application No. 2006-338139 filed on Dec. 15, 2006, the entire contents of which are incorporated herein by reference.

TECHNICAL FIELD

The present invention relates generally to a wide-angle optical system, and more particularly to an imaging or projecting optical system having an angle of view of 180° or more as represented by a fisheye lens or the like.

BACKGROUND TECHNIQUE

There has been no or little wide-angle optical system designed to have a viewing angle of view exceeding 180°, and only two have been known in the art: Patent Publication 1 shows an optical system having a viewing angle of 216° and Patent Publication 2 shows an optical system having a viewing angle of 270°.

Patent Publication 1: JP(A) 10-288742
Patent Publication 2: U.S. Pat. No. 2,947,219

The above conventional optical systems having an angle of view exceeding 180° have none of f-θ performance that helps prevent an image from becoming small around the angle of view. They are not a small-sized, fast optical system either, because the F-number is large or the optical system is not fast, and the total length is long.

Having been made with such situations of the prior art in mind, an object of the present invention is to provide a fast, superwide-angle imaging or projecting optical system that, albeit being a wide-angle optical system having an angle of view exceeding 180°, is of small size and reduced F-number.

DISCLOSURE OF THE INVENTION

According to the invention, the above object is accomplishable by the provision of a superwide-angle imaging or projecting optical system consisting only of transmitting surfaces, characterized by having an angle of view of 180° or more and comprising a front group comprising at least one meniscus lens having a negative focal length, an aperture, and a rear group comprising at least two lenses having a positive focal length, wherein at least one transmitting surface in said front group is made up of an extended rotation free-form surface.

Preferably in this case, the above front group should consist of one or two meniscus lens having a negative focal length, and all transmitting surfaces in the above front group should consist of extended rotation free-form surfaces.

Preferably, the above extended rotation free-form surface should be orthogonal to its axis of rotational symmetry at a point of intersection with the axis of rotational symmetry.

Preferably, the optical system here should satisfy the following condition (1):

$$-1.1 < F_f/F_b < -0.2 \quad (1)$$

where $F_f$ is the focal length of the above front group, and $F_b$ is the focal length of the above rear group.

Preferably, the optical system here should satisfy the following condition (2):

$$-5 < F_f/F < -1 \quad (2)$$

where F is the focal length of the whole optical system, and $F_f$ is the focal length of the above front group.

Preferably, the optical system here should satisfy the following condition (3):

$$1.5 < F_b/F < 5 \quad (3)$$

where F is the focal length of the whole optical system, and $F_b$ is the focal length of the above rear group.

BRIEF DESCRIPTION OF THE DRAWINGS

FIG. 4 is a sectional view of the wide-angle optical system of Example 2 according to the invention, as taken along the center axis.

FIG. 7 is an aberrational diagram, as in FIG. 3, of the wide-angle optical system of Example 3.

BEST MODE FOR CARRYING OUT THE INVENTION

The principles of the inventive wide-angle optical system are now explained.

What is a general wide-angle optical system is represented by a fisheye lens. However, the fisheye lenses used so far in the art have an angle of view of up to 180°, and are not suited for applications especially where the periphery of an image is photographed and viewed, because of the property of the image dwindling relatively around it. In addition, the weight of the associated optical system is heavy.

Other possible arrangement of the wide-angle optical system may be set up using a convex mirror; however, the image of a camera itself is transferred into the center of a screen with the result that the center cannot be viewed. Unless the convex mirror used is relatively large, astigmatism occurring at the convex mirror grows too large to ignore, and so resolving power goes down. There is another problem that there are light quantity losses occurring at a reflecting surface.

With such problems in mind, the invention provides a superwide-angle imaging or projecting optical system consisting only of transmitting surfaces, characterized by having an angle of view of 180° or more, and comprising a front group comprising at least one meniscus lens having a negative refracting power, an aperture, and a rear group comprising at least two lenses having a positive focal length, wherein at least one surface in the front group is made up of an extended rotation free-form surface.

A wide-angle optical system is generally composed of a negative front group and a positive rear group, but problems with a conventional aspheric surface are that rays having a wide angle of view cannot be traced down; there is some limitation to the degree of design freedom; and so on.

According to the invention, such problems can be solved for the first time by using an extended rotation free-form surface where the coordinate for defining that surface is outside the axis of center of rotation.

Figure 1:
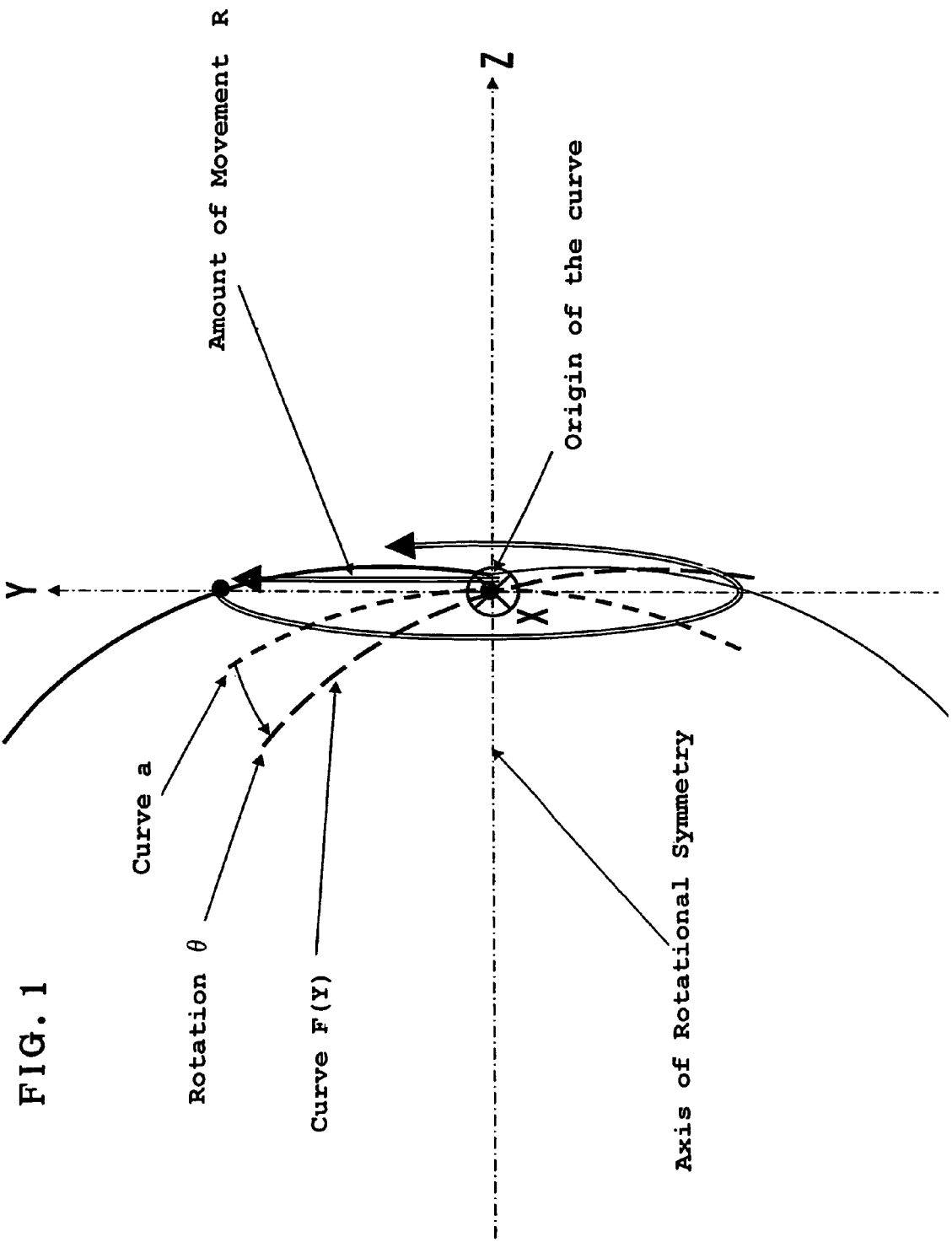
FIG. 1 is illustrative of the extended rotation free-form surface used in the wide-angle optical system of the invention.

The extended rotation free-form surface used here is now explained with reference to FIG. 1. The extended rotation free-form surface is a rotationally symmetric surface given by the following definition. First, the following curve (b) passes through the origin on the Y-Z coordinate plane is defined.

$$Z=(Y^2/RY)/[1+\{1-(C_1+1)Y^2/RY^2\}^{1/2}]C_2Y+C_3Y^2+ C_4Y^3+C_5Y^4+C_6Y^5+C_7Y^6+\ldots+C_{21}Y^{20}+\ldots+ C_{n+1}Y^n+\ldots \quad (a)$$

Then, the curve (a) is rotated by an angle θ (°) in the X-axis positive direction provided that the counterclockwise rotation is taken as positive to determine a curve F(Y). This curve F(Y) passes through the origin on the Y-Z coordinate plane, too.

The extended rotation free-form surface is defined by a rotationally symmetric surface obtained by parallel translation of that curve F(Y) by a distance R in the Y-positive direction (in the Y-negative direction when R is negative), and then rotation of the parallel translated curve (as indicated by a thick solid line in FIG. 1) about the Y-axis.

As a result, the extended rotation free-form surface becomes a free-form surface (free-form curve) in the Y-Z plane, and a circle having a radius |R| in the X-Y plane.

From this definition, the Z-axis becomes the axis of the extended rotation free-form surface (the axis of rotational symmetry).

Here, RY is the radius of curvature of the spherical term in the Y-Z section, $C_1$ is the conic constant, and $C_2$, $C_3$, $C_4$, $C_5$, etc. are the aspheric coefficients of first, second, third, and fourth order, respectively.

The reference chief ray here is defined as a light ray passing through the center of a stop (aperture) at the center of one-side angles of view (for instance, when the whole angle of view is 200°, the one-side angle of view lies in the range of 0° to 100° with the center at 50°). It is preferable to set the reference chief ray in such a way as to pass through a point to which the origin of the curve F(Y) used for the definition of the extended rotation free-form surface is moved by the distance R in the Y-positive direction, because the degree of freedom in correction of aberrations is improved (the inclination term and curvature term of the surface can be separated off), resulting in improvements in the ability of light to converge at the time of automatic correction of aberrations.

More preferably, the $3^{rd}$-order term $C_4$ should be used, because of further improvements in the f-θ property, etc. of the optical system.

More preferably and more importantly for the odd-numbered terms of the extended rotation free-from surface $C_4$, $C_6$, $C_8$..., the radius of curvature of the concave surface should grow large from the center of rotation toward the outer periphery (the curvature should become small or weak). This makes it possible to improve f-θ performance.

If the front group is made up of one or more meniscus lenses having a negative focal length, it is then possible to set up a wide-angle optical system having an angle of view of 180° or more. In that case, if all transmitting surfaces in the front group are made up of extended rotation free-form surfaces, it is then possible to obtain good enough f-θ performance.

More preferably and more importantly, the extended rotation free-form surface should be orthogonal to the axis of rotational symmetry at a point of intersection with that axis of rotational symmetry. This allows the extended rotation free-form surface to keep continuity on the axis of rotational symmetry, thereby making it possible to continuously form images of object points near the axis of rotational symmetry.

More preferably and more importantly, the optical system of the invention should satisfy Condition (1):

$$-1.1<F_f/F_b<-0.2 \quad (1)$$

where $F_f$ is the focal length of the front group, and $F_b$ is the focal length of the rear group. Condition (1) is a coefficient indicative of the degree of the so-called retrofocus: as the upper limit of −0.2 is exceeded, it causes the focal length of the rear group to grow longer than that of the front group, resulting in an increase in the total length of the optical system. As the lower limit of −1.1 is not reached, it causes the focal length of the front group to grow long, resulting in an increase in the outer diameter of the optical system.

Most preferably, $$-0.9<F_f/F_b<-0.3 \quad (1\text{-}1)$$

More preferably and more importantly, the optical system of the invention should satisfy Condition (2):

$$-5<F_f/F<-1 \quad (2)$$

where F is the focal length of the whole optical system, and $F_f$ is the focal length of the front group. Condition (2) defines the ratio between the focal length of the front group and the focal length of the whole optical system: as the lower limit of −5 is not reached and so the focal length of the front group grows longer, it makes it impossible to achieve a wide angle arrangement while diminishing the outer diameter of the optical system. As the upper limit of −1 is exceeded, it causes the focal length of the front group to become too short, failing to obtain any fast optical system.

Most preferably, $$-3<F_f/F<-1.3 \quad (2\text{-}1)$$

More preferably and more importantly, the optical system of the invention should satisfy Condition (3):

$$1.5<F_b/F<5 \quad (3)$$

where F is the focal length of the whole optical system, and $F_b$ is the focal length of the aforesaid rear group. Condition (3) defines the ratio between the focal length of the rear group and the focal length of the whole optical system: as the lower limit of 1.5 is not reached, it causes the focal length of the rear group to become too short, and more coma and astigmatism to occur at a large viewing angle, failing to form good images. As the upper limit of 5 is exceeded, it causes the outer diameter of the optical system to grow too large to set up a small-format optical system.

Most preferably, $$2<F_b/F<3.5 \quad (3\text{-}1)$$

Tabulated below are the F-numbers $F_{no}$ as well as the values of the parameters in Conditions (1), (2) and (3) in Examples 1, 2 and 3 given below and Patent Publications 1 and 2.

|   | Example 1 | Example 2 | Example 3 | Patent Publication 1 | Patent Publication 2 |
|---|---|---|---|---|---|
| $F_{no}$ | 3.3 | 3.3 | 5.6 | 5.0 | 10 |
| $F_f$ | −0.669 | −0.839 | −0.504 | 4.061 | −8.91 |
| F | 0.445 | 0.506 | 0.414 | 1.000 | 12.3 |
| $F_f/F$ | −1.502 | −1.660 | −1.218 | 4.062 | −0.72 |
| $F_b$ | 1.007 | 1.033 | 1.312 | 4.312 | 14.05 |
| $F_b/F$ | 2.261 | 2.043 | 3.172 | 4.312 | 1.14 |
| $F_f/F_b$ | −0.664 | −0.812 | −0.384 | 0.942 | −0.63 |

The wide-angle optical system of the invention is now explained with reference to Examples 1, 2 and 3. The constituting parameters of these optical systems will be given later. The parameters in these examples have been determined on the results of normal ray tracing from an object plane at infinity to an image plane 2 vie an optical system 1 as shown typically in FIG. 2.

Figure 2:
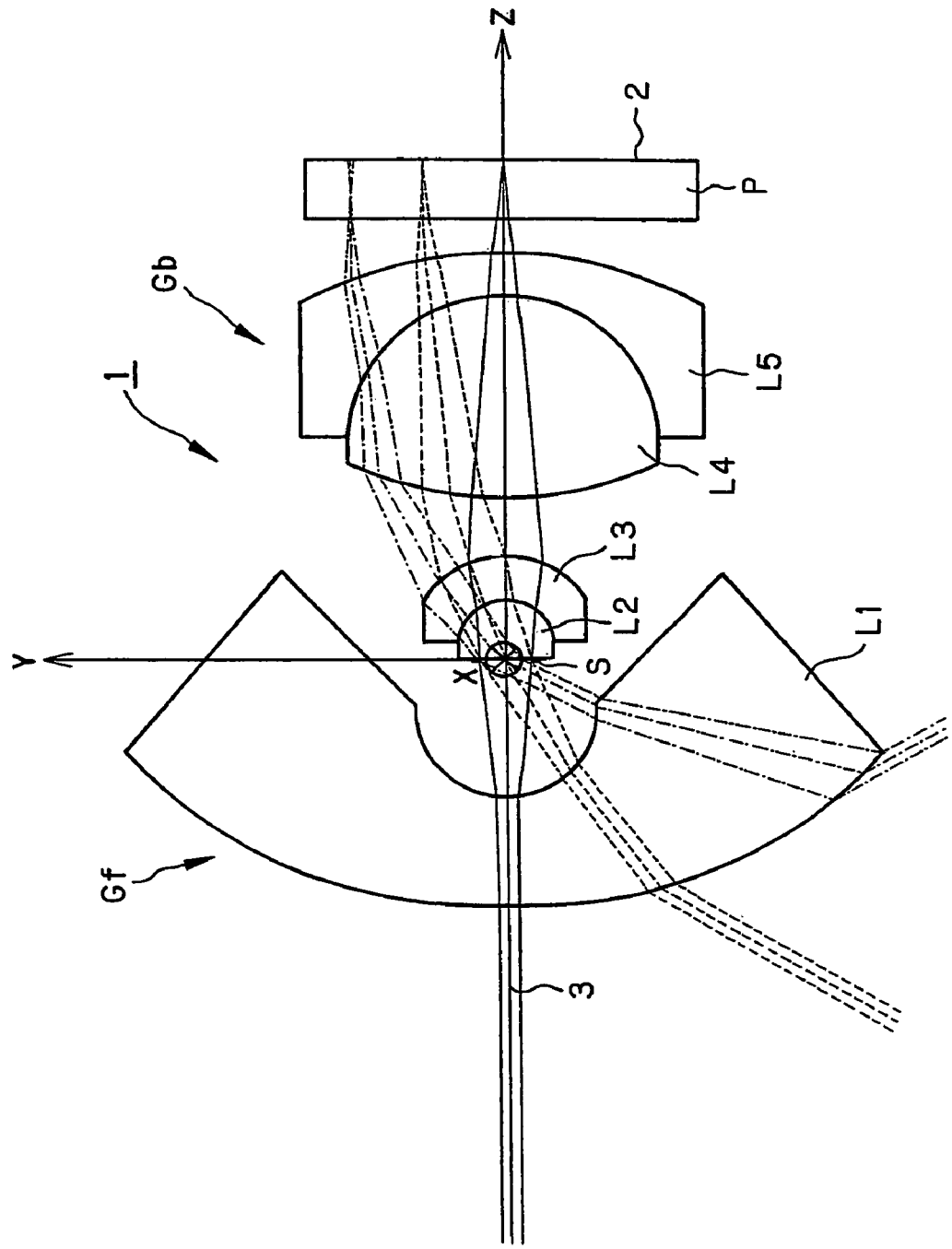
FIG. 2 is a sectional view of the wide-angle optical system of Example 1 according to the invention, as taken along the center axis.

For the coordinate system here, in normal ray tracing as shown typically in FIG. 2, the Z-axis positive direction is defined by a direction of the axis (center axis) 3 of rotational symmetry toward the image plane 2 with the center of the stop surface S as the origin, and the Y-Z plane is defined within the paper plane of FIG. 2. And the X-axis positive direction is defined by a direction going down into the sheet plane of FIG. 2, and the Y-axis positive direction is defined by an axis that forms with the X- and Z-axes a right-handed orthogonal coordinate system.

Provided for a decentered surface are the amount of decentration of that surface from the center of the origin of the aforesaid optical system on a coordinate system on which that surface is defined (X, Y, and Z is indicative of the X-axis direction, the Y-axis direction, and the Z-axis direction, respectively), and the angles of tilt ($\alpha$, $\beta$, $\gamma$(°)) of the coordinate systems for defining the surfaces with the centers on the X-, Y- and Z-axes, respectively. In that case, the positive for $\alpha$ and $\beta$ means counterclockwise rotation with respect to the positive directions of the respective axes, and the positive for $\gamma$ means clockwise rotation with respect to the positive direction of the Z-axis. Referring here to how to perform $\alpha$-, $\beta$- and $\gamma$-rotations of the center axis of the surface, the coordinate system that defines each surface is first $\alpha$-rotated counterclockwise about the X-axis of the coordinate system that is defined at the origin of the optical system. Then, the coordinate system is $\beta$-rotated counterclockwise about the Y-axis of the rotated new coordinate system. Finally, the coordinate system is $\gamma$-rotated clockwise about the Z-axis of the rotated new another coordinate system.

When, of optical surfaces forming the optical system of each example, a specific surface and the subsequent surface form together a coaxial optical system, there is a surface-to-surface space given. Besides, the radius of curvature of each surface and the refractive index and Abbe constant of the medium are given as usual.

It is noted that the term with respect to aspheric surfaces on which no data are mentioned in the constituting parameters, given later, is zero. Refractive indices and Abbe constants are given on a d-line (587.56 nm wavelength) basis, and length in mm. The decentration of each surface is given in terms of the amount of decentration from the center of the stop surface.

It should be noted that the extended rotation free-form surface is a rotationally symmetric surface defined by the aforesaid defining formula (a).

FIG. 2 is a sectional view of the wide-angle optical system of Example 1 as taken along the center axis 3 (the axis of rotational symmetry).

The wide-angle optical system 1 here is made up of 5 lenses L1 to L5, each formed of a transparent medium that is rotationally symmetric about the center axis 3 and has a refractive index of greater than 1, a stop (aperture) S, and a plane-parallel plate P that protects an image plane 2. The lens L1 is a negative meniscus lens convex on its object side; the lens L2 is a positive meniscus lens concave on its object side; the lens L3 is a negative meniscus lens concave on its object side; the lens L4 is a double-convex positive lens; and the lens L5 is a negative meniscus lens concave on its object side. The lenses L2 and L3 are cemented together, and the lenses L4 and L5 are cemented together. The lens L1 constitutes the front group $G_f$ having a negative focal length, and the lenses L2 to L5 constitute the rear group $G_b$ having a positive focal length, with the stop S interposed between the front group $G_f$ and the rear group $G_b$. And as can be seen from the constituting parameters given later, both surfaces of the lens L1 are made up of extended rotation free-form surfaces, each having odd-numbered terms $C_4$ and $C_6$, and the rest are each made up of a spherical surface.

The specifications of Example 1 are:

| | |
|---|---|
| Entrance Pupil Diameter: | φ0.133 mm |
| Half Angle of View: | 120° |
| Focal Length: | 0.445 mm |
| Image Size: | φ2.000 mm |

Figure 3B:
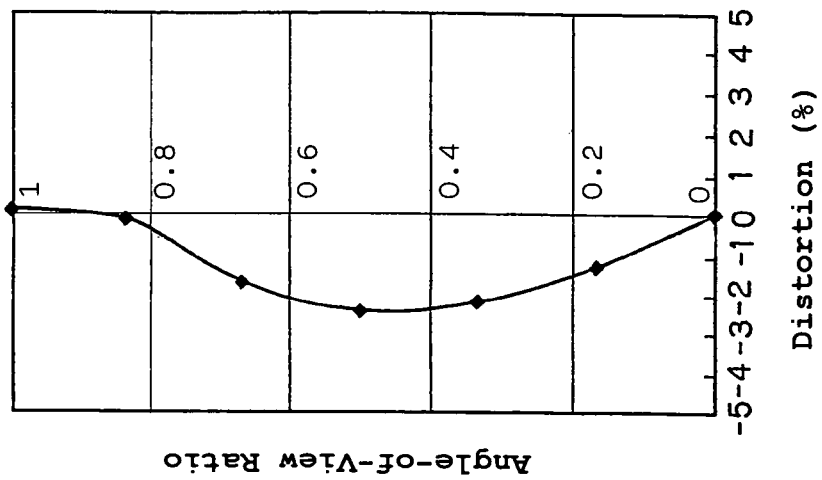
FIG. 3 is an aberrational diagram indicative of transverse aberration and distortion of the wide-angle optical system of Example 1.
Figure 3A:
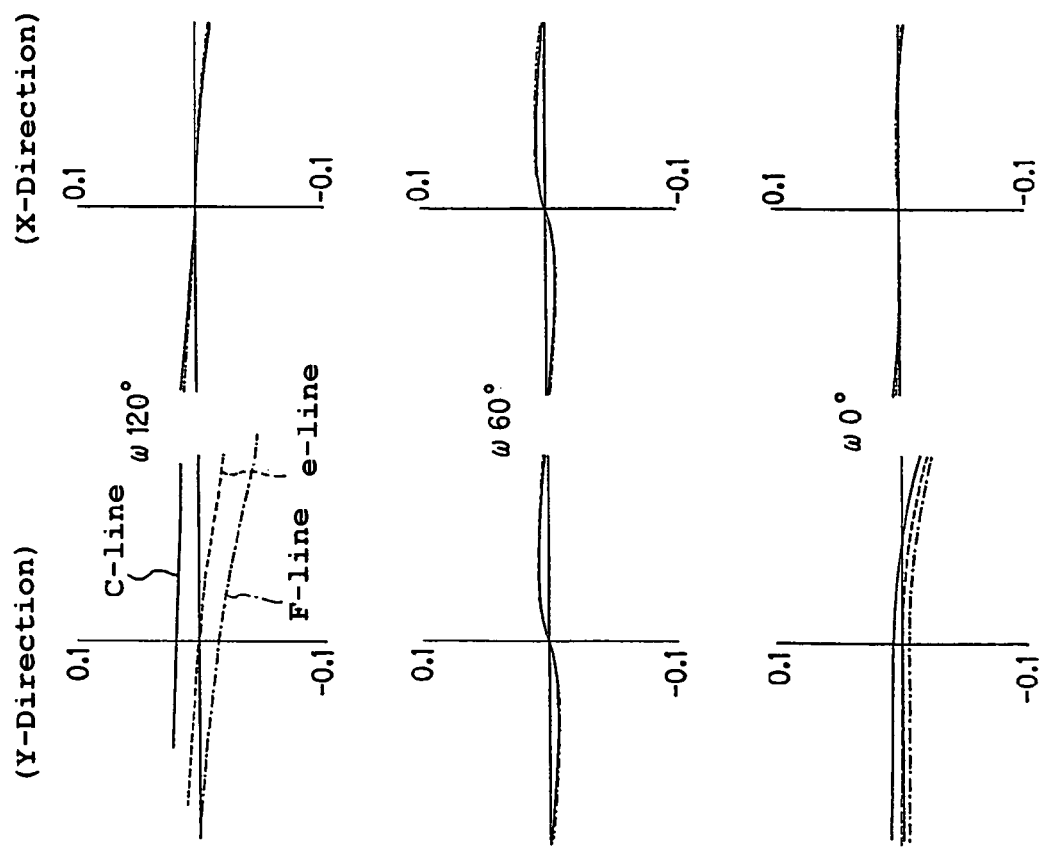

The transverse aberration for the optical system here is presented in FIG. 3(a), in which ω stands for a half angle of view, and ω0° indicates the "on-axis", with transverse aberrations at that angle of view in the Y-direction (meridional direction) and X-direction (sagittal direction). Distortion for the example here is presented in FIG. 3(b), and the angle-of-view ratio with respect to the maximum angle of view is shown as ordinate. The same will go true for the following aberrational diagrams.

A view of Example 2 similar to FIG. 2 is presented in FIG. 4.

The wide-angle optical system 1 here is made up of 6 lenses L1 to L6, each formed of a transparent medium that is rotationally symmetric about the center axis 3 and has a refractive index of greater than 1, a stop (aperture) S, and a plane-parallel plate P that protects an image plane 2. The lens L1 is a negative meniscus lens convex on its object side; the lens L2 is a positive meniscus lens concave on its object side; the lens L3 is a negative meniscus lens concave on its object side; the lens L4 is a double-convex positive lens; the lens L5 is a double-convex positive lens; and the lens L6 is a negative meniscus lens concave on its object side. The lenses L2 and L3 are cemented together, and the lenses L5 and L6 are cemented together. The lens L1 constitutes the front group $G_f$ having a negative focal length, and the lenses L2 to L6 constitute the rear group $G_b$ having a positive focal length, with the stop S interposed between the front group $G_f$ and the rear group $G_b$. And as can be seen from the constituting parameters given later, both surfaces of the lens L1 are made up of extended rotation free-form surfaces, each having odd-numbered terms $C_4$ and $C_6$, and the rest are each made up of a spherical surface.

The specifications of Example 2 are:

| | |
|---|---|
| Entrance Pupil Diameter: | φ0.154 mm |
| Half Angle of View: | 120° |
| Focal Length: | 0.506 mm |
| Image Size: | φ2.000 mm |

Figure 5B:
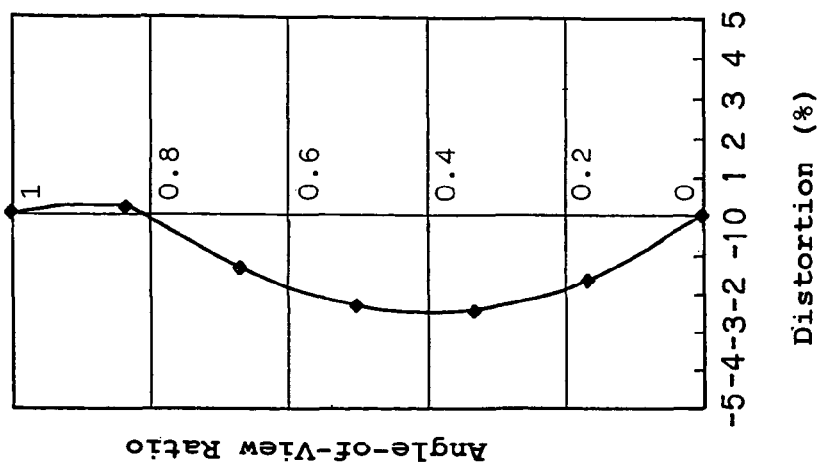
FIG. 5 is an aberrational diagram, as in FIG. 3, of the wide-angle optical system of Example 2.
Figure 5A:
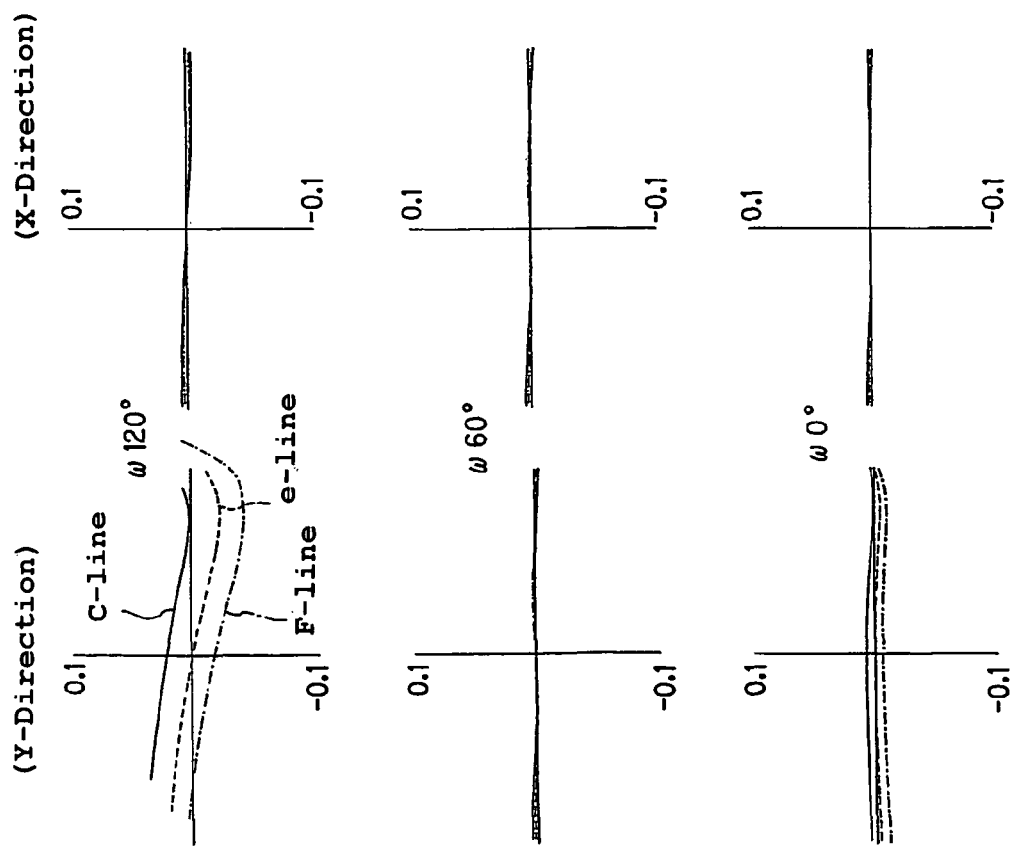

An aberrational diagram for the optical system of Example 2, similar to FIG. 3, is presented in FIG. 5.

Figure 6:
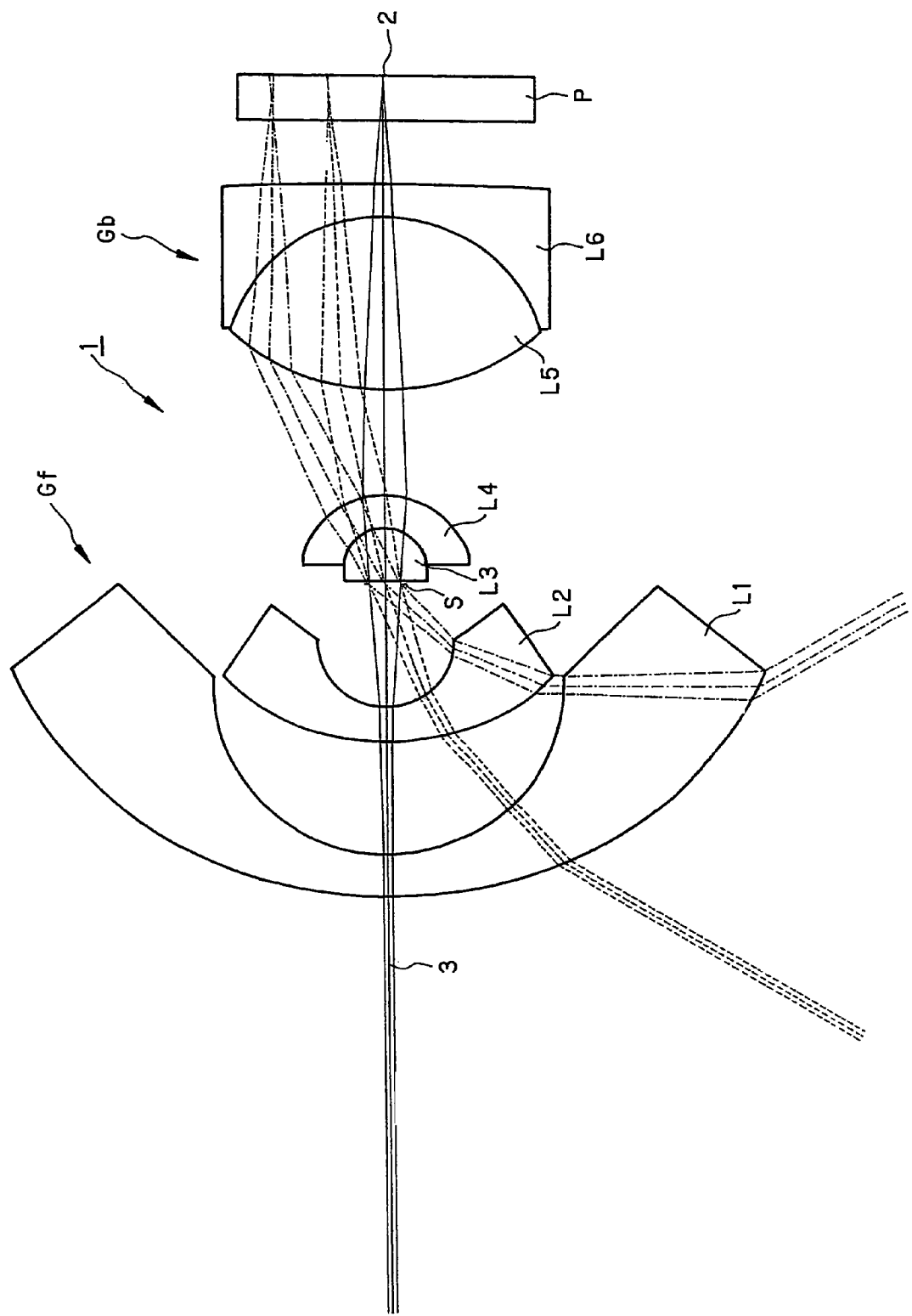
FIG. 6 is a sectional view of the wide-angle optical system of Example 3 according to the invention, as taken along the center axis.

A view of Example 3 similar to FIG. 2 is presented in FIG. 6.

The wide-angle optical system 1 here is made up of 6 lenses L1 to L6, each formed of a transparent medium that is rotationally symmetric about the center axis 3 and has a refractive index of greater than 1, a stop (aperture) S, and a plane-parallel plate P that protects an image plane 2. The lens L1 is a negative meniscus lens convex on its object side; the lens L2 is a negative meniscus lens convex on its object side; the lens L3 is a positive meniscus lens concave on its object side; the lens L4 is a negative meniscus lens concave on its object side; the lens L5 is a double-convex positive lens; and the lens L6 is a negative meniscus lens concave on its object side. The lenses L3 and L4 are cemented together, and the lenses L5 and L6 are cemented together. The lenses L1 and L2 constitute the front group $G_f$ having a negative focal length, and the lenses L3 to L6 constitute the rear group $G_b$ having a positive focal length, with the stop S interposed between the front group $G_f$ and the rear group $G_b$. And as can be seen from the constituting parameters given later, both surfaces of the lens L1, L2 are made up of extended rotation free-form surfaces, each having odd-numbered terms $C_4$ and $C_6$, and the rest are each made up of a spherical surface.

The specifications of Example 3 are:

| | |
|---|---|
| Entrance Pupil Diameter: | φ0.074 mm |
| Half Angle of View: | 120° |
| Focal Length: | 0.414 mm |
| Image Size: | φ2.000 mm |

An aberrational diagram for the optical system of Example 3, similar to FIG. 3, is presented in FIG. 7.

Tabulated below are the constituting parameters of Examples 1, 2 and 3, with "ERFS" standing for an extended rotation free-form surface.

EXAMPLE 1

| Surface No. | Radius of curvature | Surface separation | Displacement and tilt | Refractive index | Abbe's No. |
|---|---|---|---|---|---|
| Object plane | ∞ | ∞ | | | |
| 1 | ERFS[1] | | (1) | 1.8830 | 40.7 |
| 2 | ERFS[2] | | (2) | | |
| 3 | ∞ (Stop) | 0.030 | | | |
| 4 | −2.928 | 0.400 | | 1.6238 | 59.6 |
| 5 | −0.305 | 0.300 | | 1.8052 | 25.4 |
| 6 | −0.603 | 0.387 | | | |
| 7 | 2.282 | 1.400 | | 1.7030 | 48.5 |
| 8 | −1.022 | 0.300 | | 1.8052 | 25.4 |
| 9 | −2.708 | 0.225 | | | |
| 10 | ∞ | 0.400 | | 1.5163 | 64.1 |
| 11 | ∞ | 0.000 | | | |
| Image plane | ∞ | | | | |

| ERFS[1] | |
|---|---|
| RY | 3.326 |
| θ | 15.526 |
| R | −1.027 |
| $C_1$ | $-1.2390 \times 10^{-1}$ |
| $C_4$ | $-4.3688 \times 10^{-3}$ |
| $C_5$ | $-8.1874 \times 10^{-4}$ |
| $C_6$ | $-1.2432 \times 10^{-3}$ |

| ERFS[2] | |
|---|---|
| RY | 0.604 |
| θ | 46.662 |
| R | −0.416 |
| $C_1$ | $-2.5505 \times 10^{-2}$ |
| $C_4$ | $1.5249 \times 10^{-1}$ |
| $C_5$ | $1.8970 \times 10^{-2}$ |
| $C_6$ | $3.1690 \times 10^{-1}$ |

| Displacement and tilt(1) | | | | | |
|---|---|---|---|---|---|
| X | 0.000 | Y | 0.000 | Z | −1.559 |
| α | 0.000 | β | 0.000 | γ | 0.000 |

| Displacement and tilt(2) | | | | | |
|---|---|---|---|---|---|
| X | 0.000 | Y | 0.000 | Z | −0.756 |
| α | 0.000 | β | 0.000 | γ | 0.000 |

EXAMPLE 2

| Surface No. | Radius of curvature | Surface separation | Displacement and tilt | Refractive index | Abbe's No. |
|---|---|---|---|---|---|
| Object plane | ∞ | ∞ | | | |
| 1 | ERFS[1] | | (1) | 1.8830 | 40.7 |
| 2 | ERFS[2] | | (2) | | |
| 3 | ∞ (Stop) | 0.030 | | | |
| 4 | −2.755 | 0.400 | | 1.6250 | 59.3 |
| 5 | −0.282 | 0.300 | | 1.8052 | 25.4 |
| 6 | −0.595 | 0.100 | | | |
| 7 | 25.577 | 0.695 | | 1.6832 | 50.6 |
| 8 | −4.413 | 0.100 | | | |
| 9 | 4.286 | 1.200 | | 1.7157 | 47.2 |
| 10 | −1.135 | 0.300 | | 1.8052 | 25.4 |
| 11 | −2.773 | 0.218 | | | |
| 12 | ∞ | 0.400 | | 1.5163 | 64.1 |
| 13 | ∞ | 0.000 | | | |
| Image plane | ∞ | | | | |

| ERFS[1] | |
|---|---|
| RY | 3.366 |
| θ | 15.951 |
| R | −1.031 |
| $C_1$ | $-1.1535 \times 10^{-1}$ |
| $C_4$ | $-4.6493 \times 10^{-3}$ |
| $C_5$ | $-1.0380 \times 10^{-3}$ |
| $C_6$ | $-1.3781 \times 10^{-3}$ |

| ERFS[2] | |
|---|---|
| RY | 0.600 |
| θ | 47.041 |
| R | −0.431 |
| $C_1$ | $-9.8101 \times 10^{-2}$ |
| $C_4$ | $1.1219 \times 10^{-1}$ |
| $C_5$ | $-2.0321 \times 10^{-2}$ |
| $C_6$ | $2.9140 \times 10^{-1}$ |

| Displacement and tilt(1) | | | | | |
|---|---|---|---|---|---|
| X | 0.000 | Y | 0.000 | Z | −1.561 |
| α | 0.000 | β | 0.000 | γ | 0.000 |

| Displacement and tilt(2) | | | | | |
|---|---|---|---|---|---|
| X | 0.000 | Y | 0.000 | Z | −0.780 |
| α | 0.000 | β | 0.000 | γ | 0.000 |

EXAMPLE 3

| Surface No. | Radius of curvature | Surface separation | Displacement and tilt | Refractive index | Abbe's No. |
|---|---|---|---|---|---|
| Object plane | ∞ | ∞ | | | |
| 1 | ERFS[1] | | (1) | 1.8830 | 40.7 |
| 2 | ERFS[2] | | (2) | | |
| 3 | ERFS[3] | | (3) | 1.8830 | 40.7 |
| 4 | ERFS[4] | | (4) | | |
| 5 | ∞ (Stop) | 0.030 | | | |

-continued

| | | | | | |
|---|---|---|---|---|---|
| 6 | −4.530 | 0.500 | | 1.6199 | 60.3 |
| 7 | −0.367 | 0.300 | | 1.8052 | 25.4 |
| 8 | −0.769 | 0.990 | | | |
| 9 | 2.081 | 1.600 | | 1.7440 | 44.8 |
| 10 | −1.463 | 0.300 | | 1.8052 | 25.4 |
| 11 | −33.586 | 0.569 | | | |
| 12 | ∞ | 0.400 | | 1.5163 | 64.1 |
| 13 | ∞ | 0.000 | | | |
| Image plane | ∞ | | | | |

| ERFS[1] | |
|---|---|
| RY | 3.710 |
| θ | 22.976 |
| R | −1.587 |
| $C_1$ | $9.9144 \times 10^{-2}$ |
| $C_4$ | $-3.5147 \times 10^{-3}$ |
| $C_5$ | $-1.0444 \times 10^{-3}$ |
| $C_6$ | $-2.5757 \times 10^{-4}$ |

| ERFS[2] | |
|---|---|
| RY | 1.602 |
| θ | 44.420 |
| R | −1.109 |
| $C_1$ | $1.8227 \times 10^{-2}$ |
| $C_4$ | $3.3889 \times 10^{-5}$ |
| $C_5$ | $-1.9742 \times 10^{-3}$ |
| $C_6$ | $1.2183 \times 10^{-3}$ |

| ERFS[3] | |
|---|---|
| RY | 2.214 |
| θ | 14.648 |
| R | −0.551 |
| $C_1$ | 1.1838 |
| $C_4$ | $-5.5024 \times 10^{-3}$ |
| $C_5$ | $-1.8307 \times 10^{-3}$ |
| $C_6$ | $1.1043 \times 10^{-3}$ |

| ERFS[4] | |
|---|---|
| RY | 0.615 |
| θ | 36.534 |
| R | −0.358 |
| $C_1$ | $7.0131 \times 10^{-2}$ |
| $C_4$ | $8.0161 \times 10^{-2}$ |
| $C_5$ | $3.0887 \times 10^{-2}$ |
| $C_6$ | $-2.7667 \times 10^{-1}$ |

Displacement and tilt(1)

| X | 0.000 | Y | 0.000 | Z | −2.650 |
|---|---|---|---|---|---|
| α | 0.000 | β | 0.000 | γ | 0.000 |

Displacement and tilt(2)

| X | 0.000 | Y | 0.000 | Z | −2.111 |
|---|---|---|---|---|---|
| α | 0.000 | β | 0.000 | γ | 0.000 |

Displacement and tilt(3)

| X | 0.000 | Y | 0.000 | Z | −1.422 |
|---|---|---|---|---|---|
| α | 0.000 | β | 0.000 | γ | 0.000 |

Displacement and tilt(4)

| X | 0.000 | Y | 0.000 | Z | −1.049 |
|---|---|---|---|---|---|
| α | 0.000 | β | 0.000 | γ | 0.000 |

While the wide-angle optical system of the invention has been explained with reference to its principles and examples, it is understood that the invention is never limited to them, and so may be modified in various ways.

APPLICABILITY TO THE INDUSTRY

According to the invention, there can be a fast, superwide-angle imaging or projecting optical system provided that, albeit being a wide-angle optical system having an angle of view exceeding 180°, is of small size and reduced F-number and has improved f-θ performance.

What is claimed is:

1. A wide-angle imaging or projecting optical system consisting only of transmitting surfaces, comprising:
a front group comprising at least one meniscus lens having a negative focal length, an aperture, and a rear group comprising at least two lenses having a positive focal length,
wherein at least one transmitting surface in said front group is made up of an extended rotation free-form surface rotationally symmetric with respect to the Z-axis which is orthogonal to the X-axis and the Y-axis.

2. The wide-angle optical system according to claim 1, wherein said front group comprises one or two meniscus lenses having a negative focal length, and all transmitting surfaces in said front group are made up of extended rotation free-form surfaces.

3. The wide-angle optical system according to claim 1, wherein said extended rotation free-form surface is orthogonal to the axis of rotational symmetry thereof at a point of intersection with said axis of rotational symmetry.

4. The wide-angle optical system according to claim 2, wherein said extended rotation free-form surface is orthogonal to the axis of rotational symmetry thereof at a point of intersection with said axis of rotational symmetry.

5. The wide-angle optical system according to claim 3, satisfying the following condition (1):

$$-1.1 < F_f/F_b < -0.2 \tag{1}$$

where $F_f$ is a focal length of said front group, and $F_b$ is a focal length of said rear group.

6. The wide-angle optical system according to claim 4, satisfying the following condition (1):

$$-1.1 < F_f/F_b < -0.2 \tag{1}$$

where $F_f$ is a focal length of said front group, and $F_b$ is a focal length of said rear group.

7. The wide-angle optical system according to claim 3, satisfying the following condition (2):

$$-5 < F_f/F < -1 \tag{2}$$

where F is a focal length of the whole optical system, and $F_f$ is a focal length of said front group.

8. The wide-angle optical system according to claim 4, satisfying the following condition (2):

$$-5 < F_f/F < -1 \tag{2}$$

where F is a focal length of the whole optical system, and $F_f$ is a focal length of said front group.

9. The wide-angle optical system according to claim 5, satisfying the following condition (2):

$$-5 < F_f/F < -1 \tag{2}$$

where F is a focal length of the whole optical system, and $F_f$ is a focal length of said front group.

10. The wide-angle optical system according to claim 6, satisfying the following condition (2):

$$-5 < F_f/F < -1 \tag{2}$$

where F is a focal length of the whole optical system, and $F_f$ is a focal length of said front group.

11. The wide-angle optical system according to claim 3, satisfying the following condition (3):

$$1.5 < F_b/F < 5 \tag{3}$$

where F is a focal length of the whole optical system, and $F_b$ is a focal length of said rear group.

12. The wide-angle optical system according to claim 4, satisfying the following condition (3):

$$1.5 < F_b/F < 5 \quad (3)$$

where F is a focal length of the whole optical system, and $F_b$ is a focal length of said rear group.

13. The wide-angle optical system according to claim 5, satisfying the following condition (3):

$$1.5 < F_b/F < 5 \quad (3)$$

where F is a focal length of the whole optical system, and $F_b$ is a focal length of said rear group.

14. The wide-angle optical system according to claim 6, satisfying the following condition (3):

$$1.5 < F_b/F < 5 \quad (3)$$

where F is a focal length of the whole optical system, and $F_b$ is a focal length of said rear group.

15. The wide-angle optical system according to claim 7, satisfying the following condition (3):

$$1.5 < F_b/F < 5 \quad (3)$$

where F is a focal length of the whole optical system, and $F_b$ is a focal length of said rear group.

16. The wide-angle optical system according to claim 8, satisfying the following condition (3):

$$1.5 < F_b/F < 5 \quad (3)$$

where F is a focal length of the whole optical system, and $F_b$ is a focal length of said rear group.

17. The wide-angle optical system according to claim 9, satisfying the following condition (3):

$$1.5 < F_b/F < 5 \quad (3)$$

where F is a focal length of the whole optical system, and $F_b$ is a focal length of said rear group.

18. The wide-angle optical system according to claim 10, satisfying the following condition (3):

$$1.5 < F_b/F < 5 \quad (3)$$

where F is a focal length of the whole optical system, and $F_b$ is a focal length of said rear group.

19. The wide-angle optical system according to claim 1, wherein the system includes an angle of view of 180° or more.

20. The wide-angle optical system according to claim 1, wherein said at least one meniscus lens having the negative focal length is convex on an object side, and at least one surface of said at least one meniscus lens is an extended rotation free-form surface.

\* \* \* \* \*